Feb. 8, 1966   R. L. TRENT ETAL   3,234,461
RESISTIVITY-MEASURING DEVICE INCLUDING SOLID INDUCTIVE SENSOR
Filed Dec. 5, 1960

INVENTORS.
ROBERT L. TRENT
ROGER R. WEBSTER
BY
ATTORNEY 3,234,461
RESISTIVITY-MEASURING DEVICE INCLUDING SOLID INDUCTIVE SENSOR
Robert L. Trent, Mountain View, Calif., and Roger R. Webster, Dallas, Tex., assignors to Texas Instruments Incorporated, Dallas, Tex., a corporation of Delaware
Filed Dec. 5, 1960, Ser. No. 73,658
1 Claim. (Cl. 324—62)

The present invention relates to the measurement of material parameters and more particularly to the measurement of the resistivity of certain materials. It is especially adapted to measurement of the resistivity of semiconductor materials.

In the fabrication of semiconductor devices by diffusion, alloying, or combinations of these techniques it is common to start with a thin wafer of semiconductor material which may be in the order of 0.005 to 0.050 inch thick depending on the desired end product. It is necessary that the wafer of semiconductor material be of a known, desired resistivity to produce a device having the desired characteristics. Thus, some types of high voltage diodes are fabricated from material having resistivity of over 100 ohm-centimeters. On the other hand, a transistor for certain switching applications may utilize, as starting material, a wafer having resistivity of perhaps 0.5 to 1.5 ohm-centimeters, and a different type transistor would require material having a resistivity in the order of 7 to 8 ohm-centimeters. In each instance the characteristics of the completed semiconductor product are determined to a large extent by the resistivity of the starting material. The importance of being able to expeditiously determine in an accurate manner the resistivity of semiconductor materials is easily seen.

The conventional method of measuring the resistivity of semiconductor single crystal material, commonly known as the four-point probe method, involves placing four suitable, accurately spaced electrical contacts at selected points on a specimen to be measured. According to this method current is caused to flow through one pair of contacts, and a second pair of contacts is used to measure the voltage drop across a portion of the crystal, thereby giving an indication of the resistivity of the material. Needless to say this process is very time-consuming and subject to operator inaccuracy. Perhaps the biggest drawback to the four-point probe method of measuring material resistivity is the necessity of making a low resistance contact to the semiconductor material. This problem will be more fully appreciated when the difficulty involved and the extreme cleanliness required for making low resistance contacts to the semiconductor body are realized. Also, since there must be physical contact to the semiconductor crystal, the surface of the semiconductor crystal may be damaged or, in a case of the thinner wafers, the wafer may be broken as a result of the resistivity measurement. Because of the aforementioned disadvantages in utilizing the four-point probe method for measuring resistivity, it is common practice to measure resistivity on a sampling basis in which perhaps only one wafer out of 100 is checked for resistivity, although it would be much more desirable to have a means for measuring material resistivity on a 100 percent basis.

It has also been suggested that the resistivity of a body of semiconductor material be measured by placing the body of semiconductor material adjacent one end of a coil having a high Q, where Q is defined as the ratio of the inductive reactance of the coil to the effective series resistance of the coil. Circulating currents are set up in the semiconductor wafer which load the coil, thereby increasing its effective series resistance and decreasing its Q. By measuring the Q of the coil it is possible to achieve an indication of the resistivity of the semiconductor sample. However, this method has never achieved widespread use because of the difficulty in obtaining uniform coupling between the coil and the semiconductor sample. The manner in which the lines of flux generated by a coil bend at each end of a coil to form closed flux lines is well known. It is also known that the flux density changes quite rapidly in the region adjacent the ends of the coil. As it is necessary to obtain the same degree of coupling between the semiconductor sample and the coil to achieve accuracy of measurement, it is evident that the physical placement of the semiconductor sample is extremely critical and not conducive to accurate production line measurement.

The method of measurement utilizing the present invention is similar to the last mentioned method of the prior art in that it utilizes the measurement of the Q of a coil as an indication of the resistivity of the semiconductor sample. The preferred embodiment of the present invention utilizes a thin sheet of copper or other conducting material formed into one turn. That portion of the copper sheet forming the turn is slotted to allow the semiconductor sample to be inserted into the body of the turn. The magnetic lines of flux created within the slot between the upper and lower portions of the single turn are parallel and concentrated in a known physical location. As the lines of magnetic flux are parallel and a minimum of fringing exists, it is possible to achieve uniform coupling between the coil and the sample without the physical placement of the semiconductor sample being critical.

It is therefore one object of the present invention to provide an apparatus for measuring the resistivity of semiconductor samples without the necessity of making physical contact to the sample.

It is another object of the present invention to provide an apparatus for measuring the resistivity of the semiconductor sample by measuring the Q of a coil closely coupled to the sample without the necessity of critical physical placement of the sample.

Still another object of the present invention is to provide an apparatus for measuring material resistivity which is adaptable to process control operations on a 100 percent sampling basis.

Still another object of the present invention is to provide an apparatus for measuring resistivity of semiconductor samples which is adaptable for use on thin sheets of low resistivity material.

A further object of the present invention is to provide a method of measuring the resistivity of a material by placing the material within the magnetic field of a coil within an area where the magnetic flux lines are parallel.

These and other objects of the present invention will be better understood as the following detailed description of a specific embodiment of the invention unfolds when taken in conjunction with the following drawing in which.

Figure 1:
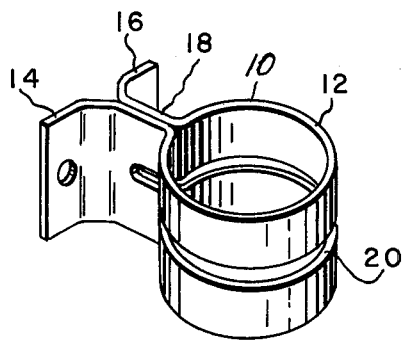
FIGURE 1 is a perspective view of the single turn coil used in a preferred embodiment of the present invention.
Figure 2:
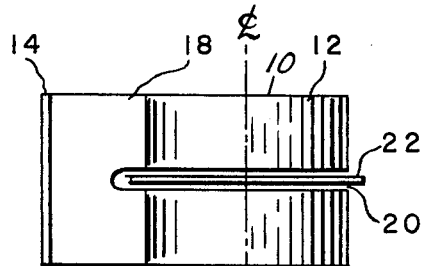
FIGURE 2 is an elevational view of the coil depicted in FIGURE 1.

Referring now to FIGURES 1 and 2 of the drawing there is shown a preferred embodiment of the standard coil used in practicing the present invention. The coil 10 may be made of 0.025 inch copper, three-fourths of an inch wide, although other low resistance materials such as silver or aluminum may be used. The coil 10 includes a cylindrical portion 12 which may be approximately ½ inch in diameter. Two integral lead members 14 and 16 provide means for electrically contacting the coil. The lead members 14 and 16 never cross one another but at region 18 they are closely adjacent one another. The slot 20 cuts the cylinder 12 in a lateral plane and extends into the region 18. Specimen 22 of semiconductor material to be tested may be placed in the slot 20 as shown in FIGURE 2.

It is seen that the slot 20 allows the semiconductor sample 22 to intersect all of the electromagnetic lines of flux which cross the slot 20 between the upper and lower portions of cylinder 12. For best results it has been found that the radius of the semiconductor wafer should be at least 1.6 times the radius of the cylindrical portion 12 of the sensing coil as this almost eliminates any inaccuracies due to fringing effects. If this condition is met, measurement will be almost completely independent of the area of the sample. Also, since there is little fringing effect at the slot and the flux lines are parallel, the location of the sample within the slot has practically no effect on the measurement. Thus, no critical dimensions, tolerances or placements are involved.

Figure 3:
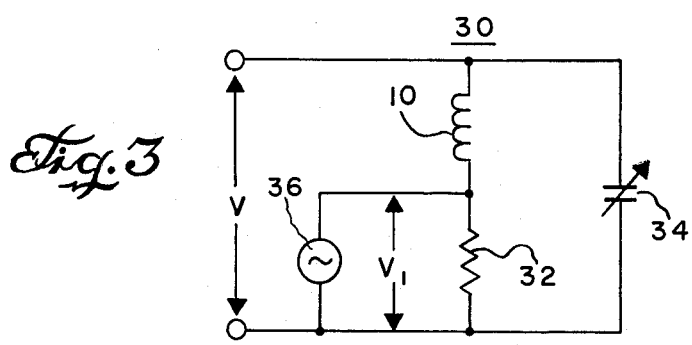
FIGURE 3 is a schematic diagram illustrating a method for measuring the Q of the coil.

FIGURE 3 is a schematic illustration of a circuit 30 such as may be used for measuring the Q of the coil 10 of FIGURES 1 and 2. The circuit 30 includes the coil 10 connected in series with a resistor 32 having a very low value of resistance. Variable capacitor 34 is connected in parallel with the resistor 32 and coil 10. An oscillator 36 drives the circuit, the resistor 32 ensuring that the circuit is driven from a low impedance source. To measure the Q of the coil 10 the circuit is driven at a predetermined frequency and constant voltage level $V_1$. The variable capacitor 34 is adjusted to give a maximum reading for the voltage V developed across the capacitor. The Q of the coil 10 may be determined by the equation $Q=V/V_1$. Various commercial Q meters such as the type 190A manufactured by Boonton Radio Corporation of Boonton, New Jersey, may be used to obtain a direct reading of Q or change in Q of the coil.

In the preferred embodiment of the present invention such a Q meter was used. The coil 10 described with reference to FIGURES 1 and 2 was connected directly to a Boonton Q meter and a signal having a frequency of 200 megacycles was used for making measurements. The coil was found to have a Q of 225. The Q of the coil is extremely important in that the higher the Q of the coil the more sensitive the device will be.

Figure 4:
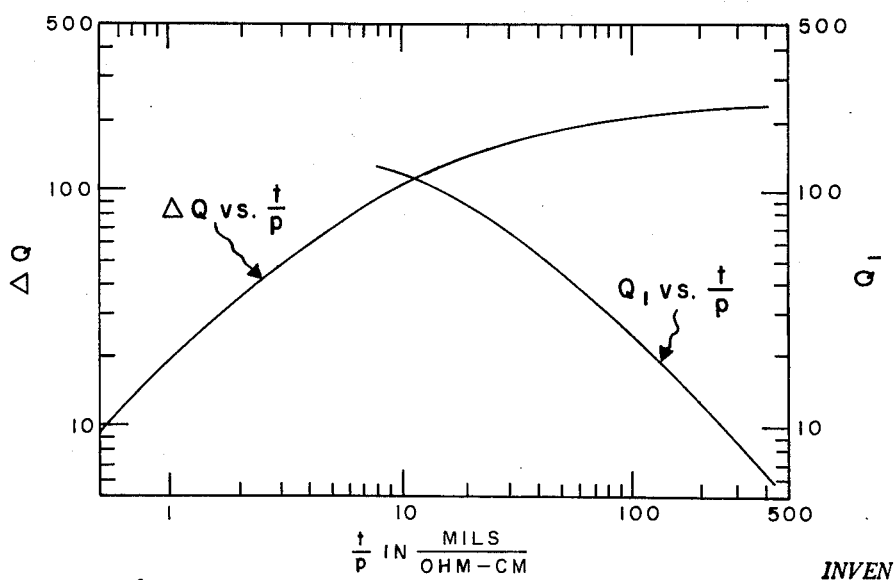
FIGURE 4 is a calibration curve for a particular coil used in practicing the present invention.

To practice the invention the wafer 22 of semiconductor material is placed within the slot 20 and the Q or change in Q of the coil is determined. As the actual indication given by the Q meter is the Q or change in Q of the coil, it is necessary to provide a curve or table for converting the Q meter readings into resistivity. Such a curve is shown in FIGURE 4. Each coil used must be individually calibrated to insure accuracy. This calibration may be accomplished by using a number of samples of known resistivity, the range of resistivities covering the range of resistivities desired to be measured in future runs. By comparing the Q meter reading against the known value of resistivity, it is possible to plot the desired calibration curve. As the samples will normally be measured by the four-point probe method, it is desirable to use a large number of samples in order to average out the error introduced by the four-point probe method.

FIGURE 4 includes two curves, one being a plot of ΔQ versus $t/\rho$ and the other curve being a plot of actual Q meter readings versus $t/\rho$ where $t$ is the thickness of the sample in mils and $\rho$ is the bulk resistivity in ohm-centimeters. By plotting the ratio of thickness to resistivity rather than the resistivity along one ordinate, it is possible to use one calibration curve for any sample regardless of thickness. The curve obtained by plotting the change in Q is more accurate for purposes of measuring high resistivity material whereas the curve which is a direct plot of the Q meter reading is more accurate for low resistivity material. In either case, however, it is possible to measure samples having a $t/\rho$ ratio of from less than 0.5 to over 300 thereby covering the usual range of measurements. The dial of the Q meter can be made to read the resistivity of a sample directly, but greater versatility is maintained by using a chart or curve to convert the measured Q of a coil to resistivity.

The measurement frequency must be chosen so that, for the range of semiconductor material resistivities of interest, the penetration depth of the electromagnetic lines of flux will be greater than the thickness of the specimens to be examined. The penetration depth of the electromagnetic lines of flux may be determined by the equation:

$$\text{Depth of Penetration} = \frac{1}{2\pi}\sqrt{\frac{\rho \times 10^9}{\mu f}}$$

where $\rho$ = resistivity in ohm-centimeters
$\mu$ = permeability of conductor
$f$ = frequency in c.p.s.

given at page 34 of the 1943 edition of Radio Engineers Handbook by F. E. Terman.

By reference to the above formula, it is seen that the frequency of 200 megacycles used in the specific example will allow the resistivity of samples up to 0.030 inch thick having bulk resistivities as low as 0.05 ohm-centimeters to be tested. It is evident that thinner samples of lower resistivity can be measured at this frequency, and that much thicker samples could be measured if the material were of higher resistivity. Thus, it is seen that a frequency of 200 megacycles per second will allow virtually all of the semi-conductor wafers which will be utilized in producing semi-conductor devices to be measured without the necessity of changing the frequency of measurement.

Although the invention has been described with reference to a particular specific embodiment, it is to be appreciated that many changes and modifications may be made by those skilled in the art, and that the invention is intended to be limited only as set forth in the appended claims.

As was pointed out before, placing a sample of material in the magnetic field of a coil changes the effective series resistance of the coil. Since the Q of a coil varies as a function of the effective series resistance of the coil, the measurement of Q provides a convenient method for indicating the series resistance or change in series resistance. However, other methods for indicating series resistance could be used. In any event, it is not necessary to obtain an absolute value of the effective series resistance.

What is claimed is:

Apparatus for measuring the resistivity of a wafer of semiconductor material comprising:

(a) an elongated strip of conductive material structurally formed to provide a cylindrical portion between the ends thereof, the cylindrical portion forming an inductive coil having one turn, (b) said strip of conductive material containing a transverse slot in said cylindrical portion, said slot containing therein a semiconductor wafer, the resistivity of which is to be measured in a position perpendicular to the major axis of the cylindrical portion so that substantially all of the lines of flux of the coil will be intercepted by the wafer, (c) and means connected to the ends of said strip for detecting the effective impedance thereof.

References Cited by the Examiner
UNITED STATES PATENTS

| | | | |
|---|---|---|---|
| 1,213,689 | 1/1917 | Price | 324—59 X |
| 2,181,899 | 12/1939 | Kennedy | 336—229 X |
| 2,534,420 | 12/1950 | Delaney | 324—40 |
| 2,572,908 | 10/1951 | Brenholdt | 324—34 |
| 2,641,682 | 6/1953 | McKenna | 219—10.79 |
| 2,708,704 | 5/1955 | Duda | 219—10.79 |
| 2,779,917 | 1/1957 | De Boisblanc | 324—40 |
| 2,859,407 | 11/1958 | Henisch | 324—40 |
| 2,877,406 | 3/1959 | Hochschild | 324—40 |
| 2,939,073 | 5/1960 | Eul | 324—40 |

WALTER L. CARLSON, *Primary Examiner.*

SAMUEL BERNSTEIN, *Examiner.*